(No Model.)
C. G. PETZOLD.
LOOM SHUTTLE.
No. 409,232. Patented Aug. 20, 1889.
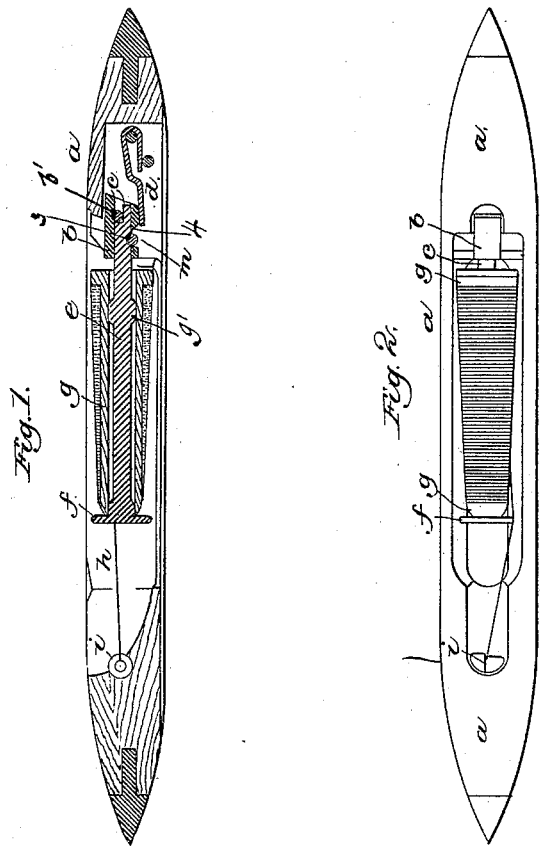
Witnesses.
John F. C. Trinkert
Henry Marsh.
Inventor.
Charles G. Petzold.
by Crosby & Gregory
attys

UNITED STATES PATENT OFFICE.

CHARLES G. PETZOLD, OF LAWRENCE, MASSACHUSETTS, ASSIGNOR TO THE ARLINGTON MILLS, OF SAME PLACE.

LOOM-SHUTTLE.

SPECIFICATION forming part of Letters Patent No. 409,232, dated August 20, 1889.

Application filed February 16, 1884. Serial No. 120,954. (No model.) Patented in England November 4, 1884, No. 14,574.

*To all whom it may concern:*

Be it known that I, CHARLES G. PETZOLD, of Lawrence, county of Essex, State of Massachusetts, have invented an Improvement in Loom-Shuttles, (for which I have obtained Letters Patent in Great Britain, No. 14,574, dated November 4, 1884,) of which the following description, in connection with the accompanying drawings, is a specification, like letters on the drawings representing like parts.

This invention in loom-shuttles has for its object to provide efficient and simple means for readily inserting and firmly retaining a headed shuttle-spindle in a spindle-receiving block pivoted in the shuttle-body.

In accordance with my invention the head or outer end of the spindle is of greater diameter than the small end of any bobbin to be used in the shuttle, so that the weft-yarn being drawn from the bobbin will travel about the head as a race, and not about the end of the bobbin, for in the latter case only bobbins which are unchecked or not split at their small ends can be used, and at its other end the spindle has an aligning surface and a transverse groove or notch near it, the end of the spindle so made entering a space in the spindle-receiving block, which latter is notched at one side to permit the engagement with the slot of the spindle of a pin carried by the shuttle-body, the aligning surface of the spindle, as herein shown, being made to co-operate with the pin which forms the pivot for the spindle-receiving block.

Prior to my invention I am aware that the spindle of a loom-shuttle has been provided with a bulb or head to retain the bobbin or cop-tube in place, and also that the inner end of the spindle has been notched to be engaged by a pin; but I am not aware that such a spindle has ever been provided at its inner end with an aligning surface to insure the placing of the notched part of the spindle in operative position with relation to the pin, which is to hold the spindle and bobbin in place when the shuttle is being used in the loom.

Figure 1, in longitudinal section, represents a loom-shuttle embodying my invention, and Fig. 2 a top view of a shuttle containing my invention.

The body $a$ of the shuttle is and may be of usual shape and material. The spindle $e$ has at one end an enlarged head $f$, and between its ends a collar $g'$. The opposite end of the spindle is flattened or cut away, as at $c$, to form an aligning surface, and is notched transversely, as at 3, so as to engage a pin $m$, fixed in the body of the shuttle, whenever the spindle is turned within the shuttle-body in the position shown by Fig. 1.

The spindle-receiving block $b$, pivoted upon the pin $b'$, held in the shuttle-body, is notched at one side, as at 4, for the entrance of the pin $m$, when the spindle is turned into the shuttle-body.

The spindle-receiving block has co-operating with it a spring $d$, which serves to keep the spindle both in the position as shown in Fig. 1, and also in its elevated position, as when the spindle is turned partially out from the shuttle-body, such movement of the spindle removing the spindle-holding block and the transverse notch of the spindle away from the pin $m$, leaving the spindle free to be withdrawn from the spindle-receiving block and also from the bobbin $g$.

The aligning surface $c$ at the end of the spindle is of such shape that it can pass into the space between the pin $b'$ and the inner wall of the block only when the transverse notch 3 is in position to engage the pin $m$, so that whenever the spindle and spindle-receiving block are turned into the shuttle-body the transverse groove of the spindle is always in correct position to engage the pin $m$.

The operator, after pushing the spindle through the bobbin and into the hole in the spindle-receiving block, has only to partially rotate the spindle until its reduced end passes into the space below the pin $b'$, the entrance of the reduced end of the spindle being readily perceptible by the sense of feeling.

The pin $m$ forms a positive lock for the spindle, and the spring $d$ acts to keep the spindle-receiving block and spindle pressed toward the pin when the spindle is turned into the body of the shuttle.

I claim—

The body of the shuttle, the spindle-receiving block provided with a notch 4, a co-operating spring, the pin $b'$, by which the said block is pivoted in the shuttle-body, and the pin $m$, combined with the headed spindle $e$, having the aligning surface $c$ and the notch 3 to co-operate, respectively, with the pins $b'$ and $m$, substantially as shown and described.

In testimony whereof I have signed my name to this specification in the presence of two subscribing witnesses.

CHARLES G. PETZOLD.

Witnesses:
  JOHN T. TABER,
  ADOLF P. VORHOLZ.